United States Patent
Park

(10) Patent No.: US 7,342,634 B2
(45) Date of Patent: Mar. 11, 2008

(54) LIQUID CRYSTAL DISPLAY OF LINE ON GLASS TYPE AND DRIVING METHOD THEREOF

(75) Inventor: Jae Hong Park, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 153 days.

(21) Appl. No.: 10/876,604

(22) Filed: Jun. 28, 2004

(65) Prior Publication Data

US 2005/0083474 A1    Apr. 21, 2005

(30) Foreign Application Priority Data

Oct. 20, 2003 (KR) .................. 10-2003-0072867

(51) Int. Cl.
*G02F 1/1345* (2006.01)
*G09G 3/36* (2006.01)

(52) U.S. Cl. ............ 349/151; 349/149; 349/150; 349/152; 345/100; 345/104

(58) Field of Classification Search ......... 349/149–152
See application file for complete search history.

(56) References Cited

U.S. PATENT DOCUMENTS

| | | | |
|---|---|---|---|
| 6,590,629 B1* | 7/2003 | Hirobe et al. | 349/149 |
| 6,639,589 B1* | 10/2003 | Kim et al. | 345/206 |
| 7,002,657 B2* | 2/2006 | Hirosue et al. | 349/149 |
| 2001/0033259 A1* | 10/2001 | Sakaguchi | 345/87 |
| 2002/0093616 A1* | 7/2002 | Park et al. | 349/149 |
| 2003/0001808 A1* | 1/2003 | Sakuma et al. | 345/87 |

* cited by examiner

*Primary Examiner*—Michael H. Caley
(74) *Attorney, Agent, or Firm*—McKenna Long & Aldridge LLP

(57) ABSTRACT

A line on glass (LOG) type liquid crystal display includes a liquid crystal display panel having a liquid crystal cell matrix, at least two integrated circuits for driving the liquid crystal display panel, and signal lines formed directly on a substrate of the liquid crystal display panel such that resistance values of the signal lines at an input terminal of each integrated circuit are different.

10 Claims, 7 Drawing Sheets

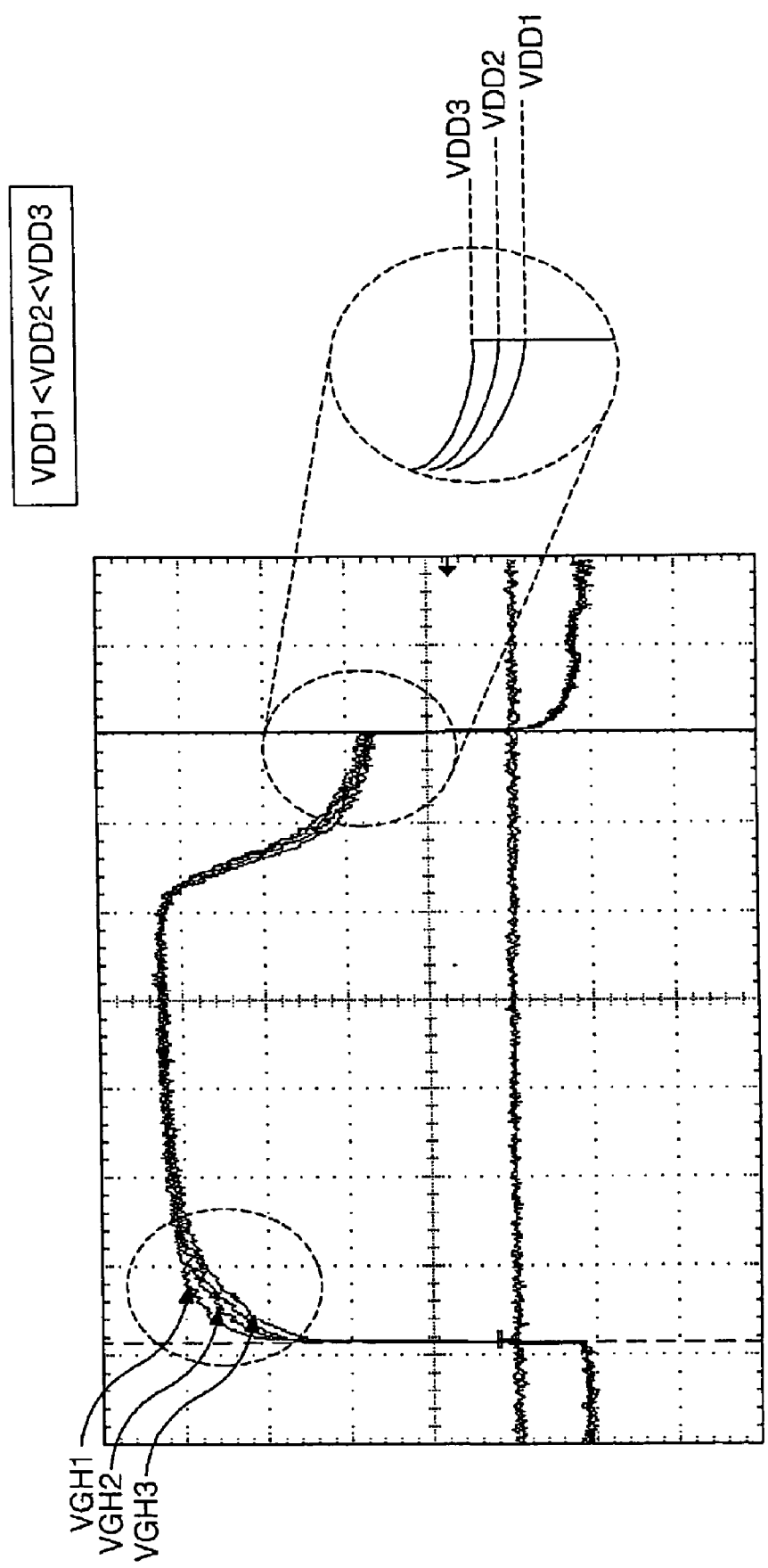

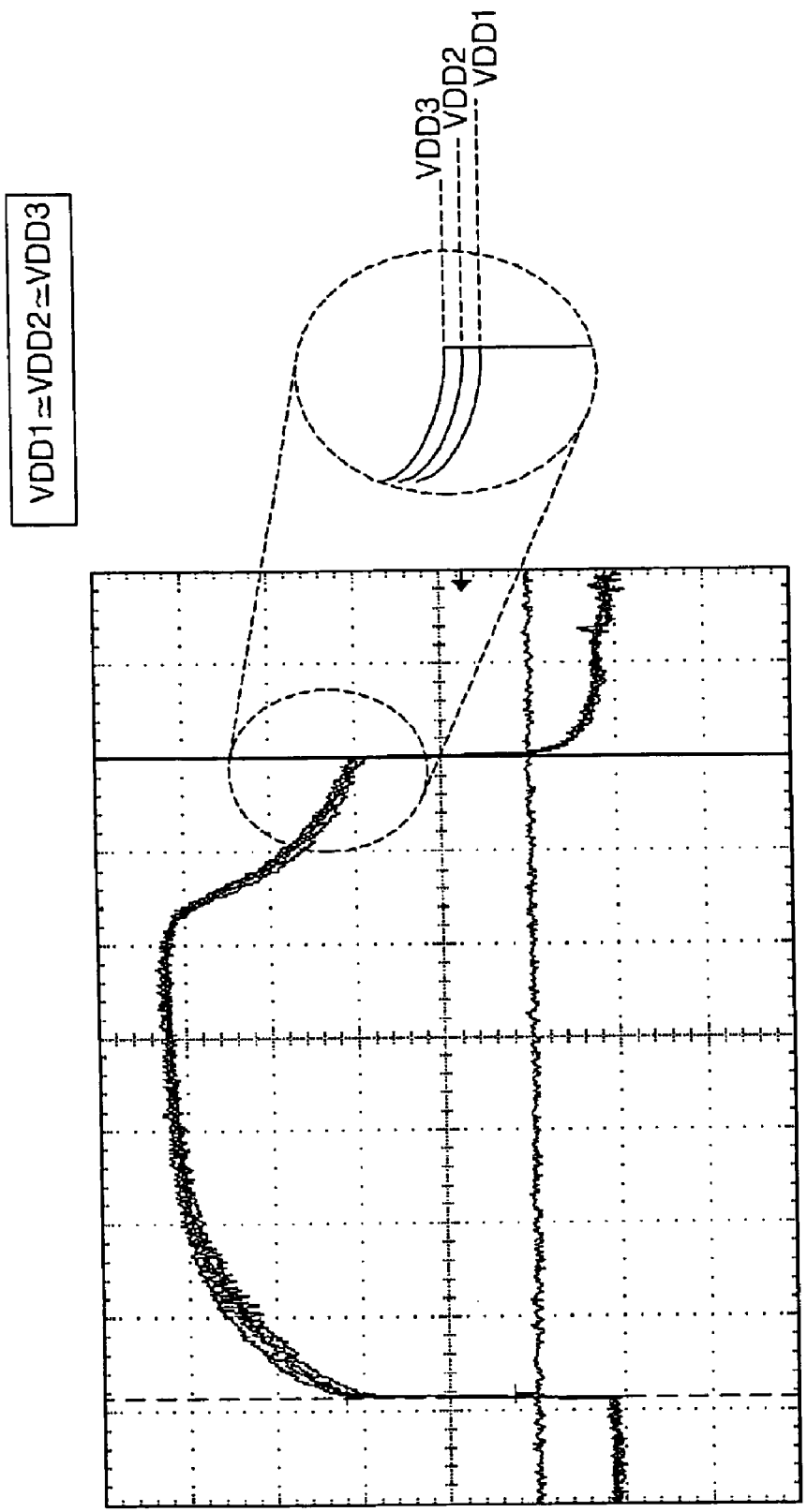

LIQUID CRYSTAL DISPLAY OF LINE ON GLASS TYPE AND DRIVING METHOD THEREOF

This application claims the benefit of Korean Patent Application No. P2003-72867 filed in Korea on Oct. 20, 2003, which is hereby incorporated reference.

BACKGROUND OF THE INVENTION

1. Field of the Invention

This invention relates to a liquid crystal display, and more particularly to a line on glass (LOG) type liquid crystal display and a driving method thereof to prevent deterioration of picture quality.

2. Description of the Related Art

Generally, a liquid crystal display (LCD) controls a light transmittance of a liquid crystal having a dielectric anisotropy using an electric field to thereby display a picture. To this end, the LCD includes a liquid crystal display panel for displaying a picture, and a driving circuit for driving the liquid crystal display panel. In the liquid crystal display panel, liquid crystal cells control light transmittance in accordance with pixel signals to thereby display a picture. The driving circuit includes a gate driver for driving gate lines of the liquid crystal display panel, a data driver for driving the data lines, a timing controller for controlling a driving timing of the gate driver and the data driver, and a power supply for supplying power signals required for driving the liquid crystal display panel and the driving circuit.

The data driver and the gate driver are separated into a plurality of integrated circuits (IC's) that are manufactured as chips. Each of the integrated drive IC's is mounted in an open IC area of a tape carrier package (TCP) or in a base film of the TCP by a chip on film (COF) system, and is electrically connected to the liquid crystal display panel by tape automated bonding (TAB) system. Alternatively, the drive IC may be directly mounted onto the liquid crystal display panel by a chip on glass (COG) system. The timing controller and the power supply are manufactured as a chip and mounted on a main printed circuit board (PCB).

The drives IC's connected to the liquid crystal display panel by the TCP are connected, via a flexible printed circuit (FPC) and a sub-PCB, to the timing controller and the power supply on the main PCB. More specifically, the data drive IC's receive data control signals and pixel data from the timing controller mounted onto the main PCB and power signals from the power supply by way of the FPC and the data PCB. The gate drive IC's receive gate control signals from the timing controller mounted onto the main PCB and power signal from the power supply by way of the PCB.

The drive IC's mounted onto the liquid crystal display panel by the COG system receive control signals from the timing controller mounted onto the main PCB and power signals from the power supply through the FPC and line on glass (LOG) type signal lines provided at the liquid crystal display panel. Even when the drive IC's are connected, via the TCP, to the liquid crystal display panel, the LCD adopts the LOG-type signal lines to eliminate the PCB, thereby having a thinner thickness. Particularly, the gate PCB delivering a relatively small number of signals is removed, and signal lines for applying gate control signals and power signals to the gate drive IC's are provided on the liquid crystal display panel in a LOG type. Thus, the gate drive IC's mounted in the TCP receives the control signals from the timing controller and the power signals from the power supply by way of the main PCB, FPC, the data PCB, the data TCP, the LOG-type signal lines and the gate TCP in turn. In this case, the gate control signals and the gate power signals applied to the gate drive IC's are distorted by line resistances of the LOG-type signal lines, thereby causing quality deterioration in a picture displayed on the liquid crystal display panel.

FIG. 1 is a schematic plan view showing a configuration of a related art line on glass (LOG) type liquid crystal display. As shown in FIG. 1, a LOG-type LCD having no gate PCB includes a main PCB 20 having a timing controller 22 and a power supply 24, a data PCB 16 connected, via a FPC 18, to the main PCB 20, a data TCP 12 having a data driving IC 14 connected between the data PCB 16 and liquid crystal display panel 6, and a gate TCP 8 having a gate driving IC 10 connected to the liquid crystal display panel 6.

In the liquid crystal display panel 6, a thin film transistor array substrate 2 and a color filter array substrate 4 are joined to each other and have a liquid crystal therebetween. Such a liquid crystal display panel 6 is provided with liquid crystal cells driven independently by respective thin film transistors, which are adjacent to where gate lines GL and data lines DL cross each other. More particularly, the thin film transistor applies a pixel signal from the data line DL to the liquid crystal cell in response to a scanning signal from the gate line GL.

The data drive IC 14 is connected, via the data TCP 12 and a data pad of the liquid crystal display panel, to the data line DL. The data drive IC 14 converts a pixel data into an analog pixel signal and applies it to the data line DL. The data drive IC 14 receives a data control signal, a pixel data and power signals from the timing controller 22 and the power supply 24 mounted onto the main PCB 20 by way of the data PCB 16 and the FPC 18.

The gate drive IC 10 is connected, via the gate TCP 8 and a gate pad of the liquid crystal display panel 6, to the gate line GL. The gate drive IC 10 sequentially applies a scanning signal having a gate high voltage VGH to the gate lines GL. Further, the gate drive IC 10 applies a gate low voltage VGL to the gate lines GL in the remaining interval excluding a time interval when the gate high voltage VGH has been supplied.

The gate control signals and the power signals from the timing controller 22 and the power supply 24 on the main PCB 20 are applied, via the FPC 18 and the data PCB 16, to the data TCP 12. The gate control signals and the power signals applied via the data TCP 12 are applied, via a LOG-type signal line group 26 provided at the edge area of the thin film transistor array substrate 2, to the gate TCP 8. The gate control signals and the power signals applied to the gate TCP 8 are input via input terminals of the gate drive IC 10. Further, the gate control signals and the power signals are outputted via output terminals of the gate drive IC 10, and applied, via the gate TCP 8 and the LOG-type signal line 26, to the gate drive IC 10 mounted in the next gate TCP 8.

The LOG-type signal line group 26 includes signal lines for supplying direct current driving voltages from the power supply 24, such as a gate low voltage VGL, a gate high voltage VGH, a common voltage VCOM, a ground voltage GND and a base driving voltage VCC; and gate control signals from the timing controller 22, such as a gate start pulse GSP, a gate shift clock signal GSC and a gate enable signal GOE. Such a LOG-type signal line group 26 is formed from the same gate metal layer as the gate lines at a specific pad area of the thin film transistor array substrate 2 in a fine pattern. Further, the LOG-type signal line group 26 is in contact with the gate TCP 8 at contact portion A, which has a contact resistance. Thus, the LOG-type signal line group 26 has a larger line resistance than signal lines on a gate PCB. This line resistance distorts gate control signals (i.e., GSP, GSC and GOE) and power signals (i.e., VGH, VGL, VCC, GND and VCOM) transmitted via the LOG-type signal line group 26, thereby generating a horizontal stripe and/or stain, which causes a deterioration of picture quality, such as cross talk in a dot pattern and a greenish hue.

FIG. 2 is a view for explaining a horizontal line stripe phenomenon in the liquid crystal display panel shown in FIG. 1. As shown in FIG. 2, the LOG-type signal line group 26 supplying the gate control signals (i.e., GSP, GSC and GOE) and power signals (VGH, VGL, VCC, GND and VCOM) includes first to third LOG-type signal line groups LOG1 to LOG3 between the gate TCPs 8. The first to third LOG-type signal line groups LOG1 to LOG3 have line resistances a, b and c proportional to the line length thereof, respectively, and are connected, via the gate TCP 8 and the gate drive IC 10, to each other in series. The first to third LOG-type signal line groups LOG1 to LOG3 generate a level difference between the gate control signals (i.e., GSP, GSC and GOE) and power signals (VGH, VGL, VCC, GND and VCOM) input for each gate drive IC 10. As a result, a brightness difference is generated between horizontal line blocks A to C that are driven by different gate drive IC's and thereby cause the appearance of a horizontal line stripe 32.

The first gate drive IC 10 is supplied with gate control signals GSP, GSC and GOE and power signals VGH, VGL, VCC, GND and VCOM across a line resistance a$\Omega$ of the first LOG-type signal line group LOG1; the second gate drive IC 10 is supplied with such gate control signals across line resistances a$\Omega$+b$\Omega$ of the first LOG-type signal line group LOG1 and the second LOG-type signal line group LOG2; and the third gate drive IC 10 is supplied with gate control signals across line resistances a$\Omega$+b$\Omega$+c$\Omega$ of the first to third LOG-type signal line groups LOG1 to LOG3. Thus, a different voltage drop is generated among scanning pulses VG1 to VG3 applied to the gate lines at the first to third horizontal blocks A to C driven by different gate drive IC's 10, thereby causing horizontal line stripes 32 among the horizontal line blocks A to C.

SUMMARY OF THE INVENTION

Accordingly, the present invention is directed to a liquid crystal display and a driving method thereof that substantially obviates one or more of the problems due to limitations and disadvantages of the related art.

An object of the present invention to provide a liquid crystal display and a driving method thereof for preventing a deterioration of picture quality due to signal distortion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a line on glass (LOG) type liquid crystal display includes a liquid crystal display panel having a liquid crystal cell matrix, at least two integrated circuits for driving the liquid crystal display panel, and signal lines formed directly on a substrate of the liquid crystal display panel such that resistance values of the signal lines at an input terminal of each integrated circuit are different.

A driving method of a line on glass (LOG) type liquid crystal display according to another aspect of the present invention includes providing signal lines directly on a substrate of the liquid crystal display panel such that resistance values of the signal lines at an input terminal of each integrated circuit are different; and driving the liquid crystal display panel using said driving signals applied to the integrated circuits.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings.

FIG. 6A and FIG. 6B are waveform diagrams of gate signals generated from gate drive IC's according to the related art and the present invention, respectively.

DETAILED DESCRIPTION OF THE PREFERRED EMBODIMENTS

Figure 1:
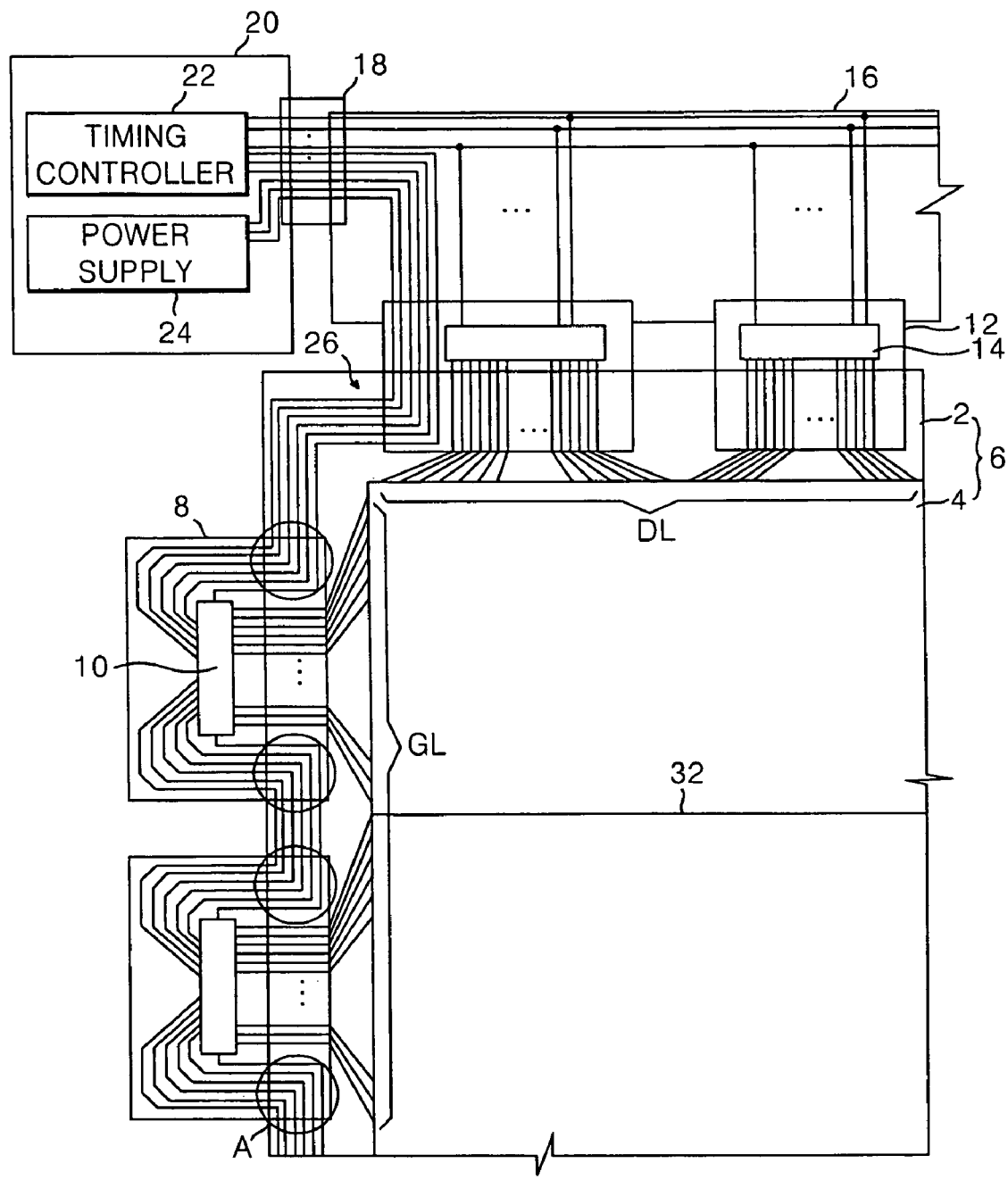
FIG. 1 is a schematic plan view showing a configuration of a conventional line on glass (LOG) type liquid crystal display.
Figure 2:
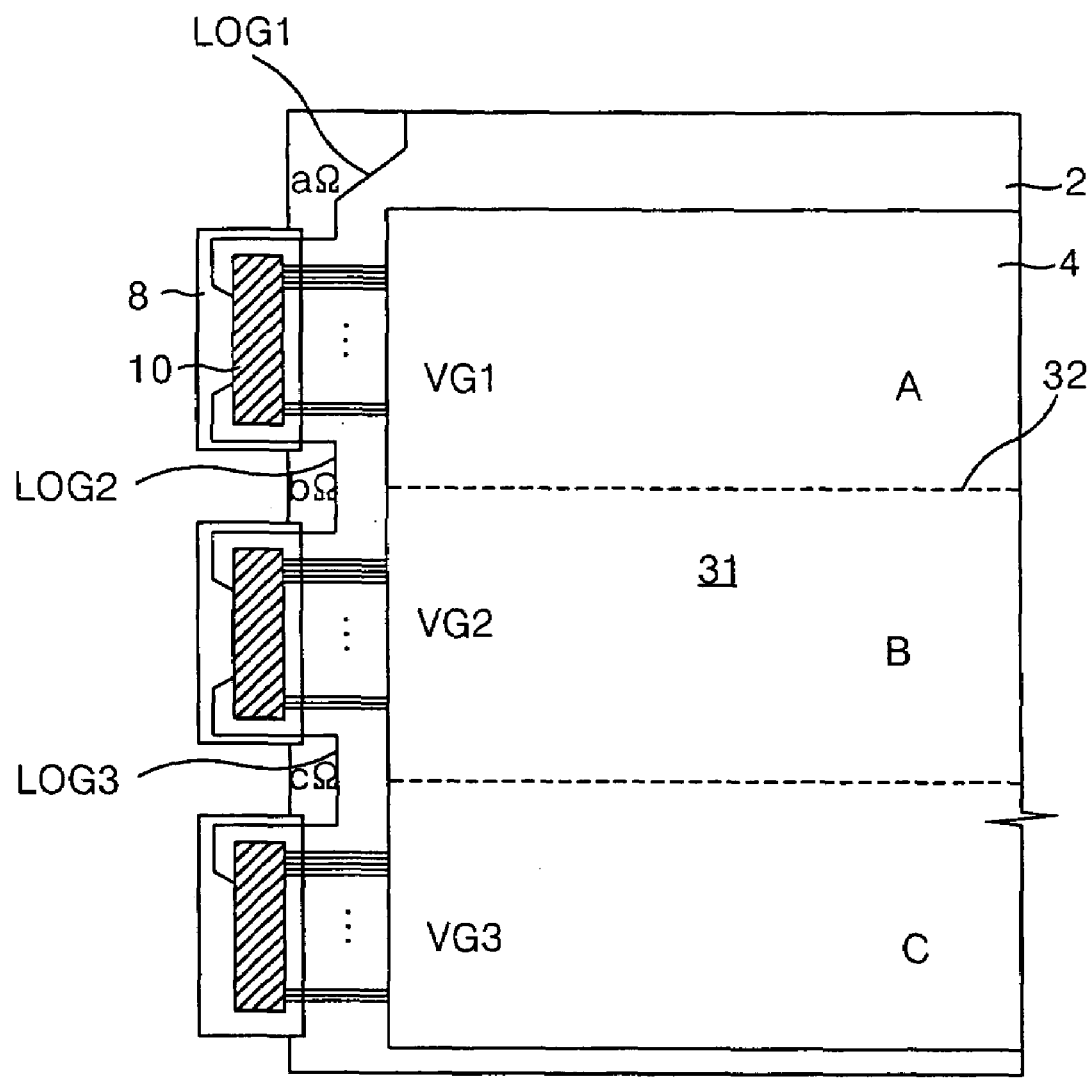
FIG. 2 is a view for explaining a horizontal line stripe phenomenon in the liquid crystal display panel shown in FIG. 1.
Figure 3:
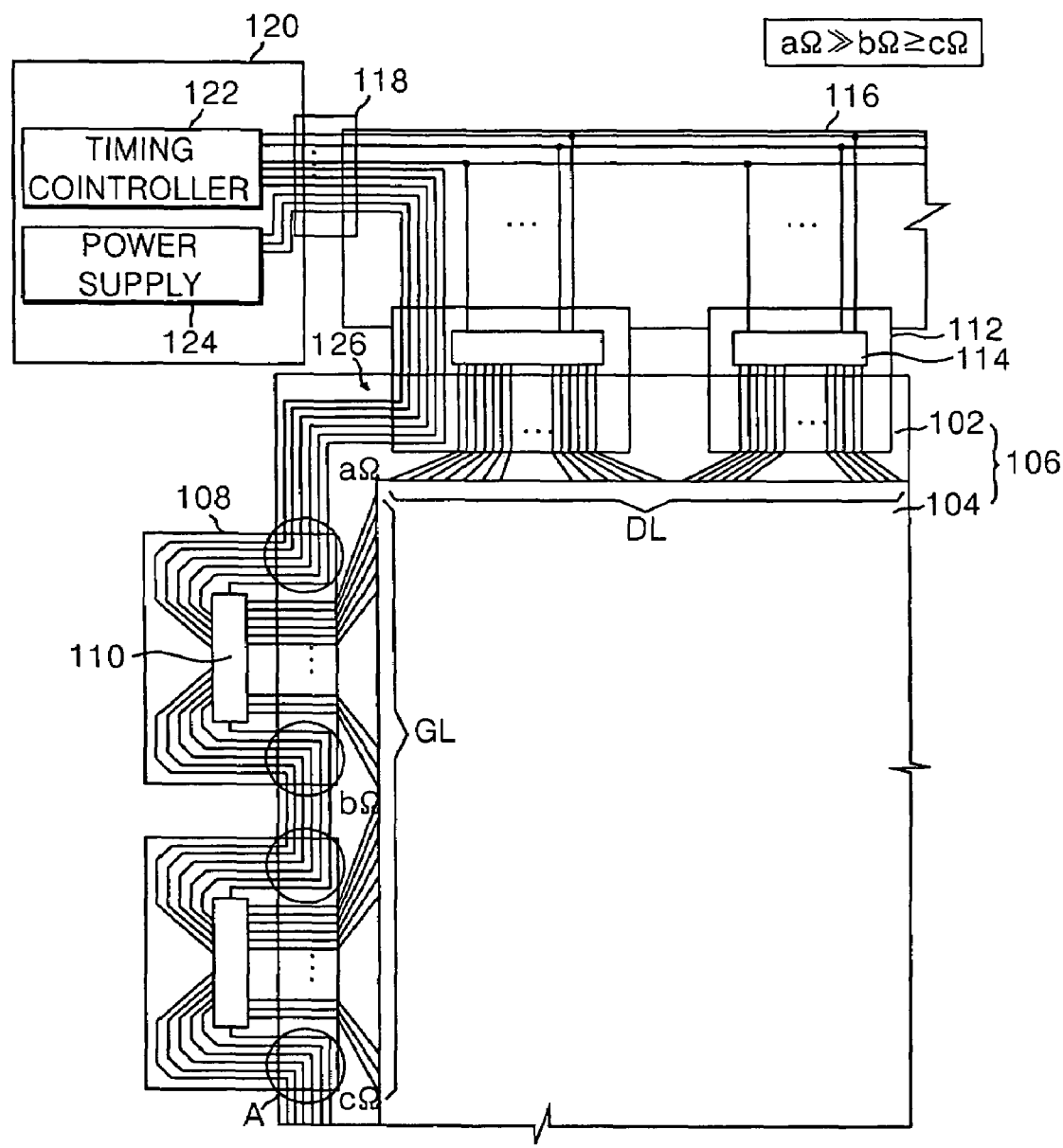
FIG. 3 is a schematic plan view showing a configuration of a LOG-type liquid crystal display according to an embodiment of the present invention.

FIG. 3 schematically shows a LOG-type liquid crystal display according to an embodiment of the present invention. As shown in FIG. 3, the LOG-type liquid crystal display includes a liquid crystal display panel 106 having a liquid crystal cell matrix, gate drive IC's 110 for driving gate lines GL of the liquid crystal display panel 106, data drive IC's 114 for driving the data lines DL of the liquid crystal display panel 106, a timing controller 122 for controlling a driving timing of the gate drive IC's 110 and the data drive IC's 114, and a power supply 124 for generating a driving voltage required for a driving of the liquid crystal display. The power supply 124 generates driving voltages (i.e., a gate high voltage VGH, a gate low voltage VGL, a reference gamma voltage and a common voltage VCOM, etc.) required for a driving of the liquid crystal display using a voltage input from a system power supply (not shown) to thereby apply the driving voltages to the timing controller 122, the data drive IC 114 and the gate drive IC 110.

The timing controller 122 interfaces video data R, G and B from the graphic card to apply them to the data drive IC 114. Further, the timing controller 122 generates timing signals and control signals for controlling a timing of the data and gate drive IC's 114 and 110 in response to a control signal from the graphic card.

In the liquid crystal display panel 106, a thin film transistor array substrate 102 and a color filter array substrate 104 are joined to each other with a liquid crystal therebetween. Such a liquid crystal display panel 106 is provided with liquid crystal cells that are each driven independently by a thin film transistor adjacent to a crossing of a gate line GL and a data line DL. The thin film transistor applies a pixel signal from the data line DL to a liquid crystal cell in response to a scanning signal from the gate line GL.

The data drive IC 114 is connected, via the data TCP 12 and a data pad of the liquid crystal display panel, to the data line DL. The data drive IC 114 converts pixel data into an analog pixel signal and applies the analog pixel data to the data line DL. The data drive IC 114 receives a data control signal, pixel data and power signals from the timing controller 122 and the power supply 124 mounted on the main PCB 120 by way of the data PCB 116 and the FPC 118.

The gate drive IC 110 is connected, via the gate TCP 108 and a gate pad of the liquid crystal display panel 106, to the gate line GL. The gate drive IC 110 sequentially applies a scanning signal having a gate high voltage VGH to the gate lines GL. Further, the gate drive IC 110 applies a gate low voltage VGL to the gate lines GL in the remaining interval excluding a time interval when the gate high voltage VGH has been supplied.

The gate control signals and the power signals from the timing controller 122 and the power supply 124 are applied, via a data PCB 116, to a data TCP 112. The gate control signals and the power signals applied via the data TCP 12 are applied, via a LOG-type signal line 126 provided at an edge area of the thin film transistor array substrate 102, to the gate TCP 108. The gate control signals and the power signals applied to the gate TCP 108 are input, via input terminals of the gate drive IC 110, to the gate drive IC 110. Further, the gate control signals and the power signals are output via output terminals of the gate drive IC 110, and applied, via the gate TCP 108 and the LOG-type signal line group 126, to the gate drive IC 110 mounted in the next gate TCP 108.

The LOG-type signal line group 126 includes signal lines for supplying direct current driving voltages from the power supply 24, such as a gate low voltage VGL, a gate high voltage VGH, a common voltage VCOM, a ground voltage GND and a base driving voltage VCC; and gate control signals from the timing controller 22, such as a gate start pulse GSP, a gate shift clock signal GSC and a gate enable signal GOE. Such a LOG-type signal line group 126 has line resistance included in the LOG-type signal line group 126 in accordance with a position of the LOG-type signal line group 126. The line resistance of a particular LOG-type signal line group 126 is set based in accordance with its position a plurality of the gate TCP's.

Figure 4:
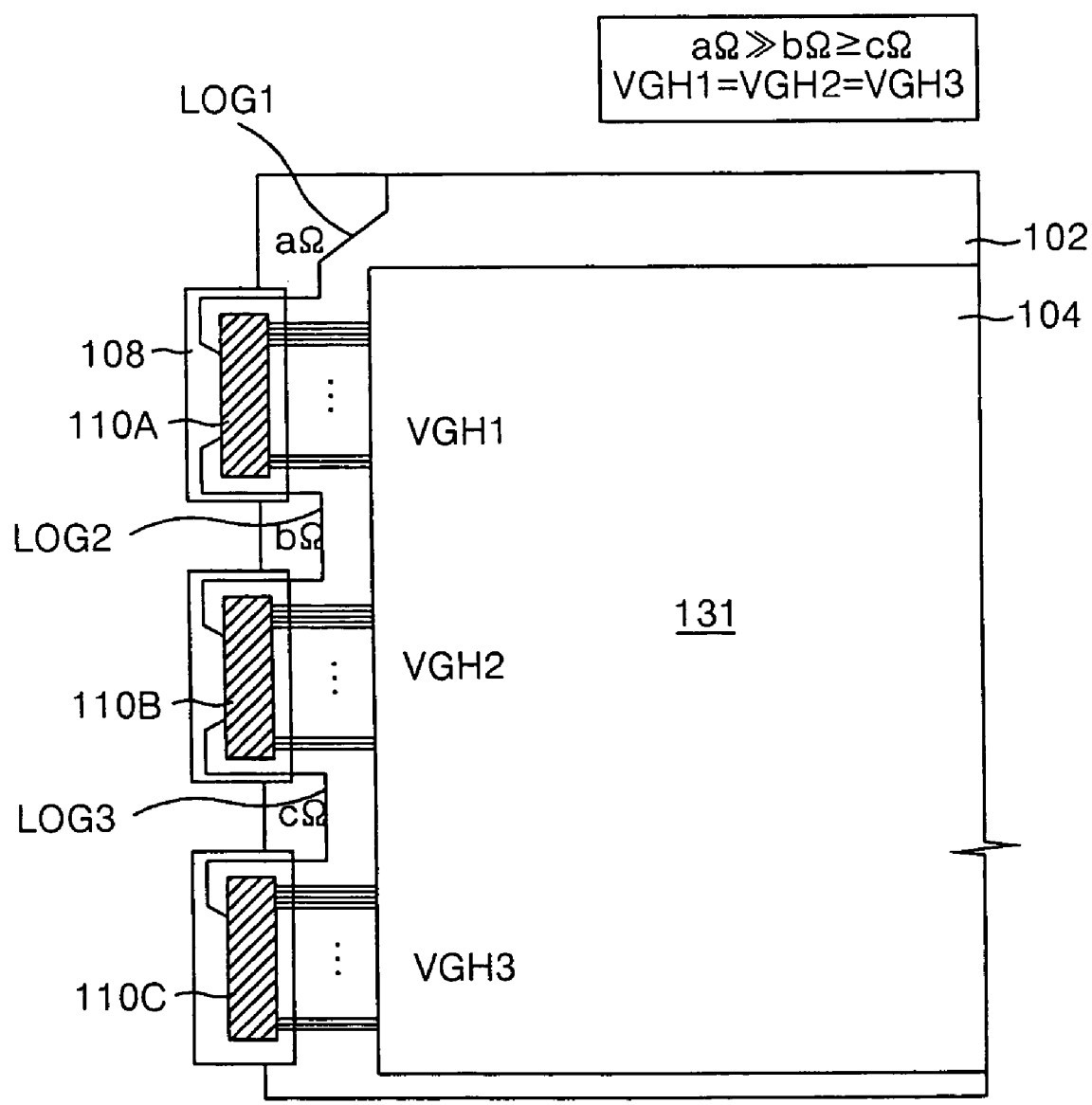
FIG. 4 illustrates a line resistance relationship among the LOG-type signal lines shown in FIG. 3.
Figure 5:
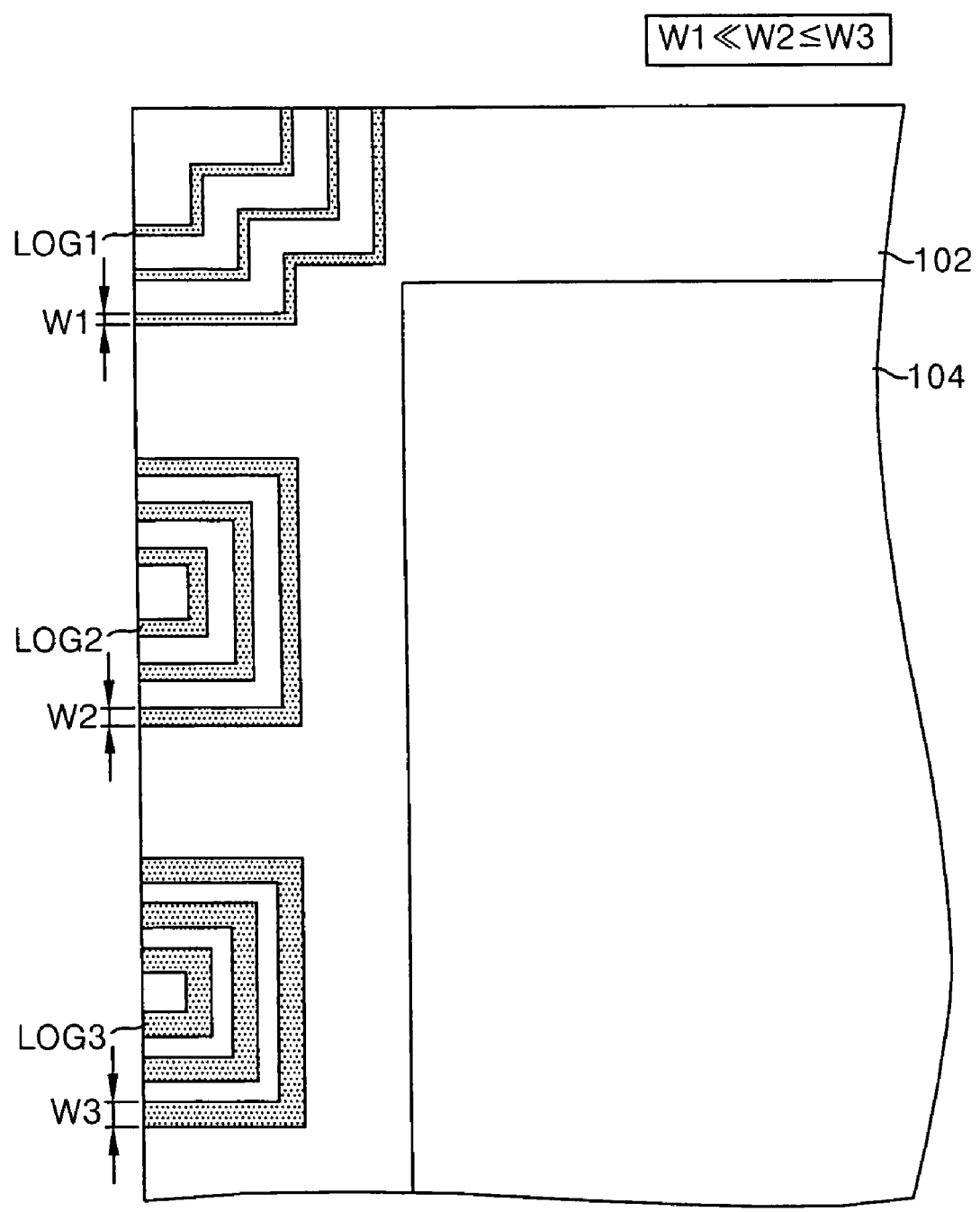
FIG. 5 illustrates a width of each LOG-type signal line shown in FIG. 4.

In other words, a LOG-type signal line group 126 has a smaller resistance value as it is positioned further from the data drive IC 114. More specifically, a first line resistance aΩ of the first LOG-type signal line group LOG1 positioned at the input terminal of the first gate drive IC 110A is larger than a second line resistance bΩ of the second LOG-type signal line group LOG2 positioned at the input terminal of the second gate drive IC 110B, as shown in FIG. 4. The second line resistance bΩ is smaller than or equal to a third line resistance cΩ of the third LOG-type signal line group LOG3. For example, the first line resistance aΩ has a large resistance value, that is, of about 300Ω that is relatively large enough to render the second line resistance bΩ and third line resistance cΩ, which are respectively about 90Ω and 80Ω, as being substantially smaller.

Such a relationship of resistance values can be done with wiring width w1 of the first LOG-type signal line group LOG1 being smaller than a wiring width w2 of the second LOG-type signal line group LOG2; and the wiring width w2 of the second LOG-type signal line group LOG2 being smaller than or equal to a wiring width w3 of the third LOG-type signal line group LOG3. In other words, the wiring width of the LOG-type signal line supplying gate power signals including a gate low voltage VGL, a gate high voltage VGH, a common voltage VCOM, a ground voltage GND and a base driving voltage VCC is gradually enlarged as it is positioned father from the data drive IC 114. Herein, a gate control signal to a gate TCP 108 is then insensitive to a line resistance irrespective of the position of the the gate TCP 108.

As described above, the second resistance bΩ and third resistance cΩ become intangibly small compared to the first line resistance a formed at the input terminal of the first gate drive IC 110A, thereby equalizing a resistance loaded on the input terminal of each gate drive IC 110. Such a first line resistance aΩ limits a current amount I of the gate power signal. Thus, a current amount I applied to each gate drive IC 110A to 110C via the remaining signal line group LOG2 and LOG3 connected, in series, to the first LOG signal line group LOG1 is limited.

Owing to such a limitation of the current amount, an affect of the line resistances bΩ and cΩ of the second and third LOG-type signal line groups on a voltage component of the gate power signal is reduced intangibly. Thus, as the same gate driving signal is applied, via each gate drive IC 110A to 110C, to the gate line GL, a brightness difference among the horizontal line blocks A, B and C is prevented. In particular, the difference of the gate high voltage VGH supplied to each gate drive IC 110 is prevented. Thus, as the same gate high voltage VGH is applied, via each gate drive IC 110A to 110C, to the gate line GL, a brightness difference among the horizontal blocks A, B and C is not generated.

The effect of preventing a gate voltage difference for each gate drive IC 110 caused by the first LOG-type signal line group LOG1 having a relatively large first line resistance a appears sharply when a scanning signal shown in FIG. 6A is applied to the gate line GL. More specifically, when the scanning signal falls, there is generated a feed through voltage ΔVp corresponding to a voltage difference between a data voltage supplied to the data line DL and a liquid crystal voltage charged in the liquid crystal cell as indicated in the following Equation (1)

$$\Delta V_P = \frac{C_{gs}}{C_{gs} + C_{lc}} (VGH - VGL) \wedge \wedge \wedge \wedge \tag{1}$$

In the above Equation (1), the feed through voltage ΔVp has a magnitude varied in accordance with a voltage difference (i.e., VGH−VGL=ΔVg) between the gate high voltage VGH and the gate low voltage VGL applied to the liquid crystal display panel to thereby cause a flicker.

In order to prevent such a flicker, a gate voltage difference is reduced with the scanning signal shown in FIG. 6A, thereby lowering the feed through voltage ΔVp. In other words, when the scanning signal falls, the gate high voltage VGH has a voltage lowered to a reference voltage VDD, so that a voltage between the gate high voltage VGH and the gate low voltage VGL becomes substantially equal to a voltage difference between the reference voltage VDD and the gate low voltage VGL. Thus, a value of ΔVg can be reduced to lower the feed through voltage ΔVp proportional to ΔVg, thereby preventing a flicker.

The first to third line resistances aΩ, bΩ and cΩ included in the first to third LOG-type signal line groups LOG1 to LOG3 are decreased, so that a voltage level of the gate high voltage VGH is varied to result in a less varied reference voltage VDD for each gate TCP 108. In other words, since the line resistances aΩ, bΩ and cΩ of the LOG-type signal line 126 are added to each other as it goes from the first gate drive IC 110A into the third gate drive IC 110C, first to third gate reference voltages VDD1, VDD2 and VDD3 applied to the horizontal line blocks has a relationship of VDD1<VDD2<VDD3. Since the first line resistance aΩ of the first LOG-type signal line group LOG1 has a relatively large resistance value, the second and third line resistances bΩ and cΩ are less significant. Such a first line resistance a limits a current amount I applied to each gate drive IC 110A to 110C via the remaining signal line group LOG2 and LOG3 connected, in series, to the first LOG signal line group LOG1. Owing to such a limitation of the current amount, an affect of the line resistances bΩ and cΩ of the second and third LOG-type signal line groups to a voltage component of the gate power signal is reduced intangibly. Thus, as an almost similar gate reference voltage signal VDD is applied, via each gate drive IC 110A to 110C, to the gate line GL, a brightness difference among the horizontal line blocks A, B and C is prevented. Accordingly, as the same gate reference voltage VDD is applied, via each gate drive IC 110, to the gate line GL as shown in FIG. 6B, a difference of the feed through voltage can be prevented and thus a brightness difference among the horizontal line blocks A, B and C can be prevented.

As described above, according to the present invention, a line resistance included in the first LOG-type signal line group located at the input terminal of the first gate drive IC has a relatively high value. To this end, wiring widths of the 1st to nth LOG-type signal line groups are different. Accordingly, a variation in the gate high voltage caused by the line resistance is prevented, so that the feed through voltage difference and the brightness difference between the horizontal blocks can be prevented. Furthermore, according to the present invention, a width of the LOG-type signal line supplying the gate high voltage is formed differentially, so that a formation area of the LOG-type signal line applying the gate low voltage can be assured to permit an easy design.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A line on glass (LOG) type liquid crystal display, comprising:
   a liquid crystal display panel having a liquid crystal cell matrix;
   at least two integrated circuits for driving the liquid crystal display panel; and
   a plurality of signal lines formed directly on a substrate of the liquid crystal display panel that connects the at least two integrated circuits in cascade,
   wherein the resistance of a signal line of the plurality of signal lines is connected between a signal source and an input terminal of a first integrated circuit located nearest the signal source is greater than the resistance of a signal line of the plurality of signal lines connected between the signal source and an input terminal of a second integrated circuit located further from the signal source than the first integrated circuit.

2. The LOG-type liquid crystal display according to claim 1, wherein a wiring width of each signal line positioned at each input terminal of the first integrated circuit of said at least two integrated circuits is different than a wiring width of each signal line positioned at each input terminal of a second integrated circuit.

3. The LOG-type liquid crystal display according to claim 1, further comprising:
   a gate line provided at the liquid crystal display panel, wherein the integrated circuit is a gate integrated circuit for applying a gate signal to a gate line.

4. The LOG-type liquid crystal display according to claim 3, further comprising:
   a data integrated circuit for applying a data signal to a data line crossing the gate line.

5. The LOG-type liquid crystal display according to claim 4, wherein a first wiring width of a first group of signal lines adjacent to the data integrated circuit is smaller than a second wiring width of a second group of signal lines positioned further away from the data integrated circuit.

6. The LOG-type liquid crystal display according to claim 3, wherein said gate integrated circuit is supplied with any one of a high logical voltage of the gate signal, a low logical voltage of the gate signal, a base common voltage, a ground voltage and a common voltage via the signal lines.

7. A driving method of a line on glass type liquid crystal display, comprising:
   providing a plurality of signal lines directly on a substrate of the liquid crystal display panel that connects at least two integrated circuits in cascade;
   and driving the liquid crystal display panel using a driving signal applied to the integrated circuits via the plurality of lines,
   wherein the resistance value of a signal line of the plurality of signal lines connected between a signal source and an input terminal of a first integrated circuit located nearest a signal source is greater than the resistance value of a signal line of the plurality of signal lines connected between a signal source and an input terminal of a second integrated circuit located further from the signal source than the first integrated circuit.

8. The method according to claim 7, wherein applying said driving signal to the integrated circuits includes:
   limiting a current component of said driving signal applied to each integrated circuit by a relatively large resistance value of the signal line provided at the input terminal of the first integrated circuit of said at least two integrated circuits.

9. The method according to claim 7, wherein applying said driving signal to the integrated circuits includes:
   supplying at least one of a high logical voltage of a gate signal, a low logical voltage of the gate signal, a base common voltage, a ground voltage and a common voltage for driving gate lines of the liquid crystal display panel.

10. The method according to claim 9, wherein said gate signal is changed from a gate reference voltage, which has a lower voltage level than a gate high voltage, into a gate low voltage when said gate signal falls.

* * * * *